United States Patent
Zamir

(10) Patent No.: US 10,901,780 B2
(45) Date of Patent: Jan. 26, 2021

(54) OPERATING SYSTEM MIGRATION WHILE PRESERVING APPLICATIONS, DATA, AND SETTINGS

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 335 days.

(21) Appl. No.: 15/804,921

(22) Filed: Nov. 6, 2017

(65) Prior Publication Data
US 2018/0060119 A1    Mar. 1, 2018

Related U.S. Application Data

(63) Continuation of application No. 14/266,773, filed on Apr. 30, 2014, now Pat. No. 9,811,375.

(51) Int. Cl.
*G06F 9/48* (2006.01)
*H04L 29/08* (2006.01)

(52) U.S. Cl.
CPC ............ *G06F 9/4856* (2013.01); *H04L 67/10* (2013.01)

(58) Field of Classification Search
USPC ............................................................ 713/1
See application file for complete search history.

(56) References Cited

U.S. PATENT DOCUMENTS

| | | | |
|---|---|---|---|
| 7,945,897 B1 | 5/2011 | Cook | |
| 2010/0153674 A1* | 6/2010 | Park | G06F 9/45533 711/165 |
| 2012/0117558 A1* | 5/2012 | Futty | G06F 8/61 717/176 |
| 2013/0219286 A1* | 8/2013 | Ben-Shaul | G06F 3/1454 715/745 |
| 2014/0146055 A1 | 5/2014 | Bala | |
| 2014/0172783 A1* | 6/2014 | Suzuki | G06F 8/63 707/609 |
| 2014/0280240 A1* | 9/2014 | Glover | G06F 8/61 707/749 |

* cited by examiner

*Primary Examiner* — Robert A Cassity

(57) ABSTRACT

An enterprise management system is described for efficient operating system migration, preserving applications, data, and settings. A staging area, such as an empty folder, is created on a client device. A base layer for the new operating system and application layers for applications that will be installed on the computing device are downloaded to the staging area. After the base layer and application layers are downloaded, the layers are merged onto the computing device to instantly install the operating system and the applications. User settings, data, and other applications can be migrated to corresponding locations in the new operating system from the old operating system.

20 Claims, 6 Drawing Sheets

OPERATING SYSTEM MIGRATION WHILE PRESERVING APPLICATIONS, DATA, AND SETTINGS

CLAIM OF PRIORITY

This application is a continuation of U.S. patent application Ser. No. 14/266,773, filed on Apr. 30, 2014 and entitled "OPERATING SYSTEM MIGRATION WHILE PRESERVING APPLICATIONS, DATA, AND SETTINGS", by inventor Tal Zamir, which is incorporated by reference herein in its entirety.

TECHNICAL FIELD

The present disclosure generally relates to techniques for migrating between operating systems on computer devices on a network.

BACKGROUND

Enterprise desktop management is one of the most challenging tasks for Information Technology (IT) departments of large organizations today. A typical IT department needs to be able to upgrade users' operating systems, as well as restore the user applications, data, and settings after the migration on demand. One issue for IT departments is the complexity of migrating operating systems and managing applications on a large number of different computers of enterprise users. Further, upgrading of operating systems and the subsequent need to restore user applications can cause significant interruptions to the users' work if the user is unable to use the machine while installations are in progress. In addition, operating system migration may be tied to a deadline (e.g. expiration of a license), requiring a large number of machines to be migrated in a short timeframe. To compound these difficulties, today's enterprises are often dispersed over multiple geographic locations and the use of Local Area Networks (LANs) connected over one or more Wide Area Networks (WANs) with variable bandwidths and latencies is a serious barrier to providing efficient network management without sacrificing end user experience.

In a typical desktop management environment, an IT department can manage client devices remotely to provide updates, update operating systems, install applications, and perform other IT functions for the client devices. A client device on the network can be a physical machine, such as a computer, a laptop, or a tablet where all of a user's data and applications are stored or accessed. Enterprise desktop management can provide a more centralized and efficient client environment that is easier to manage by enterprise IT administrators. However, many issues still persist. For example, each time an IT administrator migrates a client device to a new operating system, the administrator may need to run an installer and figure out how to restore the user's applications, data, and settings, which is time consuming. The migrations can require manual assistance, and the process may be disruptive to the user's work. Accordingly, performing operating system migrations on large numbers of client devices can be extremely challenging. A more efficient approach is desirable for migrating client devices to new operating systems on enterprise networks.

DETAILED DESCRIPTION

Figure 1:
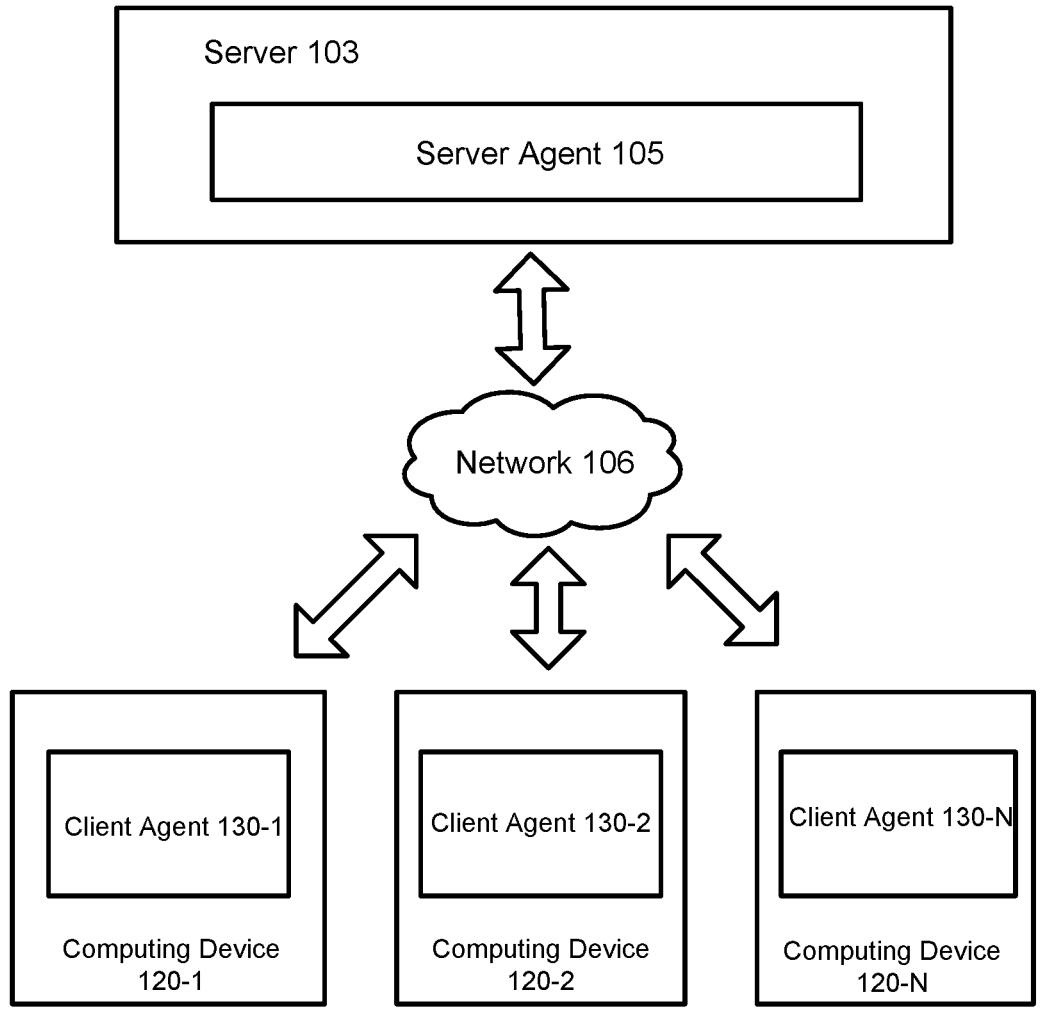
FIG. 1 illustrates an example of an enterprise network environment, in accordance with various embodiments.

Systems and methods in accordance with various embodiments of the present disclosure overcome at least some of the above mentioned shortcomings and deficiencies by providing more efficient ways to manage client devices in enterprise environments. In particular, embodiments described herein improve the efficiency of migrating client devices to new operating systems while preserving applications, user data, and user settings.

In various embodiments, the systems and methods described herein provide for efficient operating system migration, preserving applications, data, and settings. The system comprises multiple computing devices communicatively linked to a server. IT administration functions can be carried out on the multiple computing devices through the server. To migrate a computing device to a new operating system, a staging area, such as an empty folder, can be created in the system of the computing device. In one embodiment, the staging area is a dedicated, protected file-system folder on the client device. A base layer for the new operating system and application layers for applications that will be installed on the computing device with the new operating system can be downloaded to the staging area. The download can occur as a background process running over time on the client device and in a controlled, efficient manner so as not to interrupt a user of the computing device or significantly affect performance.

In the process, the system can identify when an updated version of an application that is compatible with the new operating system is available and download the application layer for the updated version to the staging area. After the base layer and application layers are downloaded, the system can merge the base layer and the application layers onto the computing device to install the operating system and the applications. The merging of the base layer and application layers can include changing the master file table of the file system. Because the merge does not include writing the actual content blocks to a new location but only modifies the master file table of the file system, the merge can be performed quickly so that the migration is finished in a minimal amount of time, without unduly interruption to the user. Certain applications that do not have a corresponding application layer can be transferred directly by moving the application's files and registries from locations in the legacy (i.e., "old") operating system directly to corresponding locations in the new operating system (e.g., staging area). User settings and data can be transferred to the new operating system from the legacy operating system using a protocol that maps the location of user data and user setting from the legacy operating system to the new operating system.

In this manner, operating system migration can be completed on numerous endpoints that may be distributed across different locations. The migration can be completed within a short time frame (e.g. prior to expiration of a license) and in an automated manner. User data, user settings, and applications can be preserved as part of the migration and user down-time and interruptions during the process can be minimized.

As used herein, the term "enterprise network" refers to a system of multiple client devices that are centrally managed. A client device can be either a physical machine or, in a virtual network environment, a virtual machine. For example, a client device can be a physical machine, such as a computer, a laptop, or a tablet where all of a user's data and applications are stored and accessed on the client device by the user. The client device can communicate with a central server that might be hosted in a data center (or other location) over a remote network connection, such as a WAN connection, to enable IT administrators to carry out management functions such as updates, installations, backups, and other modifications and services. An agent application on each client device can enable the communication with the central server such that instructions, requests, and/or data can be communicated between the central server and the client devices. "Client device" and "computing device" may be used interchangeably in this application.

In some embodiments, the client device can be a virtual machine in a virtual enterprise desktop environment such as Virtual Desktop Infrastructure (VDI). In the virtual environment, each user is provisioned a virtual desktop and is allowed to access his or her virtual desktop over a remote network connection, such as a WAN connection. Numerous virtual desktops can be executed and managed in a single central location (e.g., in a data center) and accessed by users remotely. It is noted that, in these virtual environment embodiments, a "client device" can be a virtual machine that is being executed on a host server inside of a data center, which can be accessed by a user over the network.

The system described herein is comprised of many client devices and a central server that might be located in a data center. Users of the network can access client devices either directly or, for example in a virtual environment, through a remote interface. Each client device can be centrally managed by the server to perform operations on the client device such as updates, installations of applications, un-installations of applications, fixes, changes in settings, migration to different operating systems, etc. The server may be physically located in a data center or any other location of the enterprise.

As used herein, the term "base layer" refers to an image that contains the entire content of the operating system (e.g., Windows XP, Windows 7, etc.) that corresponds to the base layer, including files, registry entries, and certain database contents (e.g., operating system-specific databases, etc.). For example, a base layer for an operating system can be created by installing the operating system onto a computer device and scanning the entire file system of the computing device. Merging the base layer onto a computing device applies the image to the computing device by transferring the files, registry entries, and certain database contents in the base layer to the computing device, and thereby installs the operating system on the computing device. An application layer, on the other hand, contains all of the files, registry entries and databases that can be merged on a computing device to install a new application (or an updated version of an existing application) on the computing device. The application layer may also include drivers and virtual devices.

In various embodiments, when merging a layer (base layer or application layer) onto a computing device, the system can view the files, registry entries, and database entries of the computing device and compare them to the files, registry entries, and database entries in the layer. Based on the comparison, the system can determine which files should be added to the computing device, which files should be deleted from the computing device, and/or which files on the computing device should be overwritten by files in the layer. Similarly, based on the comparison, the system can determine which registry entries and database contents should be changed in the merge. A draft of how the computing device desktop will look after the merge can be produced based on the comparison and the actual changes can be implemented to complete the merge when the user restarts the computing device. The files, database entries, and/or registry entries can be stored in a side folder and the changes can be implemented when the user restarts the computing device. In various embodiments, a merge may include moving some existing files aside and placing new files from the layer instead of them. This methodology allows for modifications to be applied to the computing device seamlessly and with little interruption and downtime, as opposed to traditional methods such as executable installers, which can require the user to stop tasks, slow down the machine, and require manual assistance from the user or from IT administrators.

FIG. 1 illustrates an example of an enterprise network environment, in accordance with various embodiments. The enterprise network environment includes multiple computing devices (120-1, 120-2, 120-N) that can be centrally managed through a server 103 that is communicatively coupled with computing devices (120-1, 120-2, 120-N) via a network 106. The server 103 may be located in a data center or any other location of the enterprise. A client agent application (130-1, 130-2, 130-N) on each computing device (120-1, 120-2, 120-N) and a server agent application 105 on the server 103 can enable communication between the server 103 and the computing devices (120-1, 120-2, 120-N) such that information such as instructions, requests, and/or data can be communicated between the server 103 and the computing devices (120-1, 120-2, 120-N). Network 106 may further include numerous other components, such as one or more firewalls, connection brokers, management servers, etc., which are not shown here so as to not obscure salient features of the enterprise desktop environment. A computing device (e.g., 120-1, 120-2, 120-N) can be either a physical machine or, in a virtual network environment, a virtual machine. For example, a computing device (e.g., 120-1, 120-2, 120-N) can be a physical machine, such as a computer, a laptop, or a tablet where all of a user's data and applications are stored and accessed directly on the computing device by the user. A computing device (e.g., 120-1, 120-2, 120-N) can communicate with the server 103 over a remote network connection 106, such as a WAN connection, to carry out management functions such as updates, installations, backups, migrations to new operating systems, and other modification and services. Alternatively, the computing device (e.g., 120-1, 120-2, 120-N) can be a virtual machine in a virtual enterprise network environment such as Virtual Desktop Infrastructure (VDI). In the virtual environment, each user is provisioned a virtual desktop and is allowed to access his or her virtual desktop over a remote network connection 106, such as a WAN connection. Numerous virtual desktops can be executed and managed in a single central location and accessed by users remotely. It is noted that, as used herein, a "computing device" (e.g., 120-1, 120-2, 120-N) can be a physical machine or a virtual machine. Each computing device (e.g., 120-1, 120-2, 120-N) can be centrally managed by the server 103 to perform operations on the computing device (e.g., 120-1, 120-2, 120-N) such as updates, installations of applications, un-installations of applications, fixes, changes in settings, and migration to different operating systems for users of computing devices (e.g., 120-1, 120-2, 120-N).

It should be noted that the particular network deployment illustrated in FIG. 1 is shown purely for purposes of illustration and is not intended to be in any way inclusive or limiting to the embodiments that are described herein. For example, a typical network would include many other types of devices, such as switches, power supplies, databases, cooling systems and other environmental controls, and the like, which are not illustrated herein. Similarly, the server may not be located in a data center and might instead be located in the workplace/offices of the enterprise. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
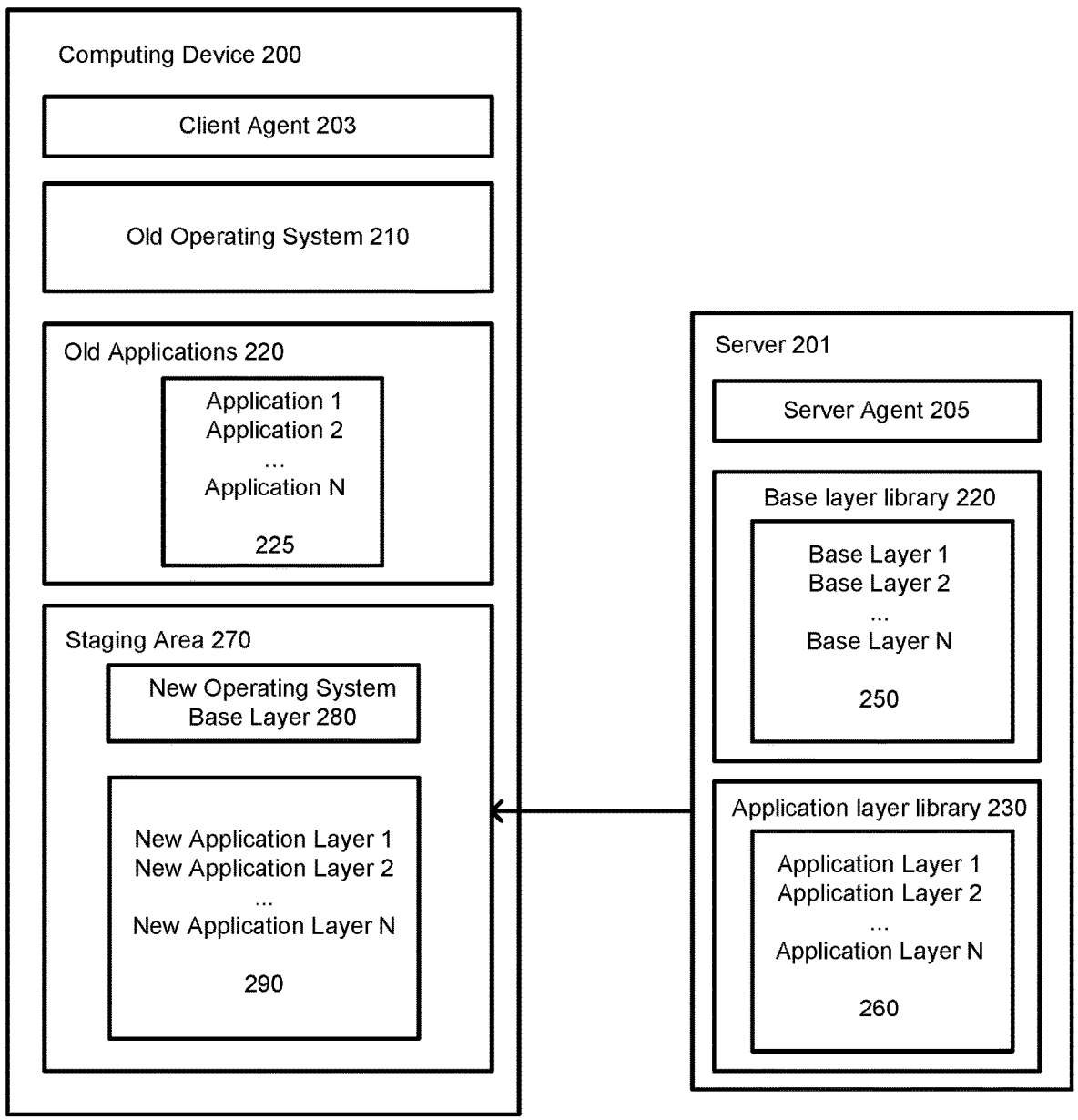
FIG. 2 provides an example of a system for operating system migration, according to various embodiments.

FIG. 2 provides an example of a system for operating system migration, according to various embodiments. As illustrated in the example of FIG. 2, a computing device 200, can be communicatively linked to a server 201. The computing device 200 and the server 201 can be part of an enterprise network, such as the network environment illustrated in FIG. 1. A client agent application 203 on the computing device 200 and a server agent application 205 on the server 201 can enable communication between the server 201 and the computing device 200 such that information such as instructions, requests, and/or data can be communicated between the server 201 and the computing device 200. The computing device 200 has an old operating system 210 and a set of old applications 220, such as application 1 through application N 225, installed on it.

The system can receive a request to upgrade the computing device 200 to a new operating system, such as a request to upgrade the computer device 200 from Windows XP to Windows 7. For example, such a request can be originated by the IT department. A staging area 270 can be created in the computing device 200. The staging area 270 can be a location for storing data, such as a folder. After the staging area is created, a base layer for the new operating system 280, such as a base layer for Windows 7, can be downloaded to the staging area 270 from the server 201. The base layer 280 download can occur in the background while the old operating system is running and the user is online and using the machine, without interrupting the user. To minimize interruption or slowing down of the computer device 200, the base layer 280 can be downloaded slowly or in a way that does not overload the bandwidth of the connection. In various embodiments, the base layer 280 can be downloaded using techniques for efficient use of the computer device's 200 processing power and data transfer capacity, such as WAN-optimization techniques. Similar download techniques can be used for downloading other data from the server, such as application layers.

The Server 201 can contain a base layer library 220 where several base layers, such as base layer 1 through base layer N 250 can be stored. For example, the base layer library 220 can contain different base layers 250 for different operating systems, for different variations of operating systems, for different types of computer devices (Dell, Lenovo, Apple), for different user types (marketing professionals, engineers, admins, etc.), or based on any other characteristic that might require a unique base layer. Further, base layers 250 may be bundled with other components, such as security software. For example, when an IT administrator sends an instruction to migrate the computing device 200 to a new operating system, the system can retrieve a base layer for the new operating system 280 corresponding to the requested operating system (e.g., a Windows 7 base layer) from the list of base layers 250 in the base layer library 220, and the new operating system base layer 280 can be downloaded to the staging area 270.

In various embodiments, new application layers 290 can be downloaded to the staging area 270 from the server 201. The new application layers 290 can be merged onto the computing device during the operating system merge to install corresponding applications on the computing device. The server 201 can contain an application layer library 230 where application layers 260 for various applications can be stored. The new application layers 290 that are downloaded to the staging area 270 can be selected from the application layer library 230 based on predetermined logic or rules. For example, the system can look at the legacy (i.e., "old") applications 220 installed on the computing device prior to the merge to the new operating system and the system can select application layers 260 from the application layer library 230 that correspond to the legacy applications 220 such that the user's applications may be restored in the merge. The application layers corresponding to the legacy applications 220 can be downloaded to the staging area 270 and merged onto the computing device during the operating system merge to install the old applications 220 on the computing device with the new operating system.

In various embodiments, the IT department can pre-determine which application layers 260 will be downloaded to the staging area 270 of any particular computing device 200 based on the device's 200 characteristics, or based on the characteristics of a user of the device 200. Alternatively, the system can implement rules or other predetermined logic to determine which application layers 260 will be downloaded to the staging area 270 of any particular computing device 200. This can allow the IT administrators to deliver to each user of a computing device 200, new and existing versions of applications that the user requires for his or her work, as part of the operating system upgrade.

In various embodiments, the system can look at the applications 225 installed on the computing device and determine whether a new version of any of these applications 225 is available, such as a new version that is compatible to be executed on the new operating system. If a new version is available, then an application layer for such a new version can be downloaded to the staging area 270. For example, the system can check whether a version of any particular one of the old applications 225 is available for the new operating system. This can be particularly important because some of the old applications 225 may not be compatible with the new operating system. For example, the system can contain an application version database that lists various applications and indicates when a new version of an application in the list that is compatible with the new operating system is available. The system can reference such a database to determine whether a new version of any of the old applications 225 is available for the new operating system. When such a version is available, the system can retrieve an application layer from the application layer library 230 for such a new version and download the application layer to the staging area 270. Accordingly, during the merge, the new version of the application, which is compatible with the new operating system, will be installed instead of the old version, which may not be compatible. Further, the application version database can indicate when one of the old applications 225 will not be compatible with the new operating system and the application layers for such incompatible application would not be downloaded to the staging area 270.

For example, a computing device (e.g., 200) may be running on Windows XP with application A1 and the device 200 may be being migrated to Windows 7. The system can automatically detect that an application A2 is an updated version of application A1 and is designed for Windows 7, while A1 is not compatible with Windows 7. The system can then automatically retrieve an application layer from the application layer library (e.g., 230) for application A2 and download it to the staging area (e.g., 270) so that application A2 can be installed with the new operating system during the operating system merge. For example, this matching can be performed based on extracted MSI "product identifiers" and "upgrade codes" from the Windows registry.

Once files have been downloaded to the staging area 270, the new operating system base layer 280 and new application layers 290 can be merged onto the computing device 200 to install the new operating system and applications. For example, this can be accomplished by executing a boot-time component that moves the files on disk (without any data copy) to reflect the new operating system and applications, and sets the correct master boot record and volume boot record on the disk, while preserving the partitioning scheme. This switch can be relatively instant because it only moves folders on disk. For example, if a file in the staging area were located in "c:\StagingArea\windows\system32\app.dll", the merge can simply modify the master file table of file system to move that file to the location "c:\windows\system32\app.dll" without actually writing the blocks for this file on the physical disk to a new location. As such, the operation can be completed in substantially less time than copying the actual content. Further, the actual switch can be performed at any time requested by the IT department; thus, the download operations and the merge operations can be separated and scheduled as needed. As a result, the system allows upgrading a computing device 200 to a new operating system while preserving and upgrading applications with minimized interruption and downtime for a user of the computing device 200.

In various embodiments, the user data and settings can be transferred from the legacy operating system to the new operating system so that the data and settings are preserved during the migration. For example, some user settings, locations, and registries may be different between the new operating system (e.g., Windows 7) and the previous operating system (e.g., Windows XP). The system can contain a protocol including a mapping of user data locations and user setting locations from the old operating system to the new operating system so that the data and settings can be automatically transferred from the old operating system to corresponding locations in the new operating system. For example, the system can capture and export user data and user settings from the old operating system and import it back into corresponding locations after the new operating system is in place. This can be performed with available user-space migration tools, such as Microsoft's User State Migration Tool (USMT).

In various embodiments, during migration from the an old operating system to a new operating system, an application can be transferred directly to the new operating system by transferring the application's files and registries from locations in the old operating system to corresponding locations in the new operating system. For example, the system can contain a mapping that described how certain application files and registries should be moved from an old operating system to a new operating system. Such a mapping can be uniquely produced for a particular application or for a particular set or type of applications. The system can contain a database of such mappings for various applications and the database can be referenced by the system to retrieve a mapping as may be needed to migrate an application. The system can contain an application compatibility database that indicates which applications can and/or cannot be directly migrated in this way and/or which applications are not compatible with the new operating system. For example, this method can be used for applications for which the system does not contain an application layer.

Accordingly, the systems and methods described can allow for migration to a new operating system in a way that does not excessively interrupt or slow down the computing device while preserving applications on the computing device, upgrading applications, and preserving user settings. Further, the process can be completed automatically without manual intervention from personnel, such as the IT department, and the process can be performed on numerous computing devices simultaneously. This can improve the efficiency of managing operating system migrations on devices on an enterprise network.

Figure 3:
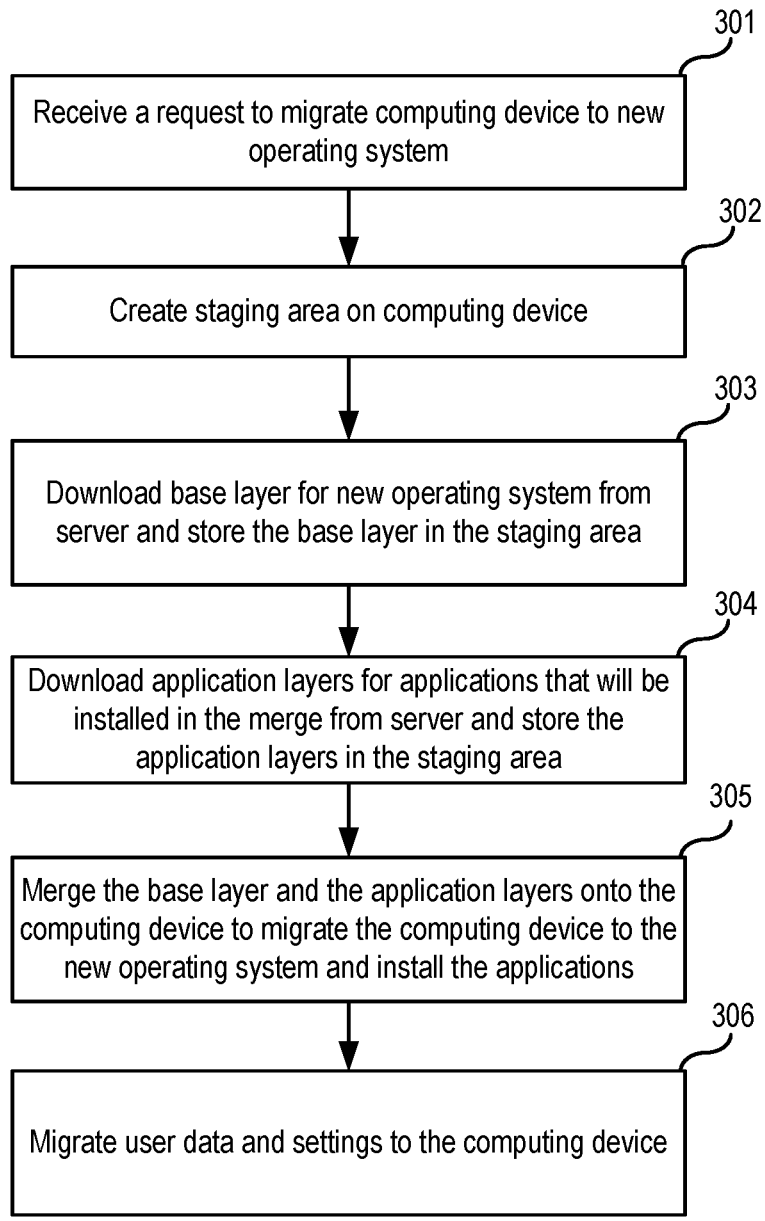
FIG. 3 illustrates an example of a process for operating system migration, according to various embodiments.

FIG. 3 illustrates an example of a process for operating system migration, according to various embodiments. The system can receive a request to migrate a computing device from an old operating system to a new operating system 301. The computer device may be one of numerous computing devices on a network of computer devices centrally managed by a server through the network. Such a request can be received from the IT department of an organization. After receiving the request, the system can create a staging area on the computing device 302. A base layer for the new operating system can be retrieved from the server, downloaded to the computing device, and stored in the staging area 303.

Application layers for applications that will be installed in the merge can be downloaded from the server and stored in the staging area 304. The application layers can be chosen according to a rule engine that determines which applications should be installed on the computing device with the new operating system. For example, the rule engine can select applications to best preserve the applications that were installed on the computing device prior to the merge. The system can scan the applications on the user device and check whether an updated version of any of the applications that is compatible with the new operating system is available. If an updated version is available, the system can retrieve an application layer for the updated version. In various embodiments, IT administrators can determine which applications are desired to be installed on particular computing devices and modify the rule engine accordingly.

The base layer and the application layers can be downloaded to the staging area in a controlled manner so that the user of the computing device is not interrupted and the performance of the computing device is not significantly degraded. For example, the download rate can be controlled so that enough processing power and connectivity bandwidth is available for the user of the computing device to carry out his or her tasks.

After the new operating system base layer and the application layers are downloaded to the staging area, the system can merge the base layer and the application layers onto the computing device to migrate the computing device to the new operating system and install the applications 305. The merge can be performed by moving files on the hard disk (without any data copy) to reflect the new operating system and applications. Accordingly, the merge can occur in a short period of time, not causing interruption or interference with the user of the computing device. User data and settings can be migrated to the computing device 306 to preserve the data and settings from the old operating system. For example, the system can capture and export user data and user settings from the old operating system and import it back into corresponding locations after the new operating system is in place. This can be performed with available user-space migration tools, such as Microsoft's User State Migration Tool (USMT).

Figure 4:
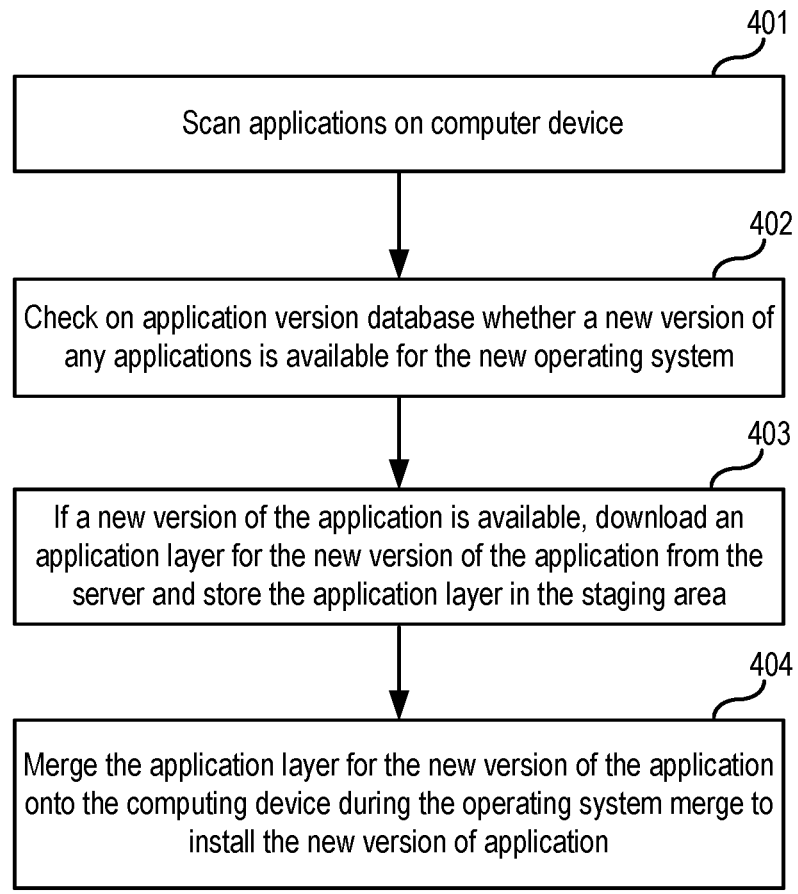
FIG. 4 illustrates an example of a process for identifying an updated version of an application, according to various embodiments.

FIG. 4 illustrates an example of a process for identifying an updated version of an application, according to various embodiments. When determining what application layers to download to a computer device's staging area during operating system migration, the system can scan the applications on the computer device 401 to determine what applications are present. The computer device may be one of numerous computing devices on a network of computer devices centrally managed by a server through the network. After the applications are identified by the scan, the system can check on an application version database whether a new version of any identified applications is available for the new operating system 402. The application version database can contain a list of various applications and indicate when a new version of an application in the list is available. For example, a new version may be compatible with the new operating system, while the previous version of the application may not be. If a new version of the application is available, the system can download an application layer for the new version of the application from the server and store the application layer in the staging area 403. During the operating system merge, the system can merge the application layer for the new version of the application onto the computing device to install the new version of the application 404.

Figure 5:
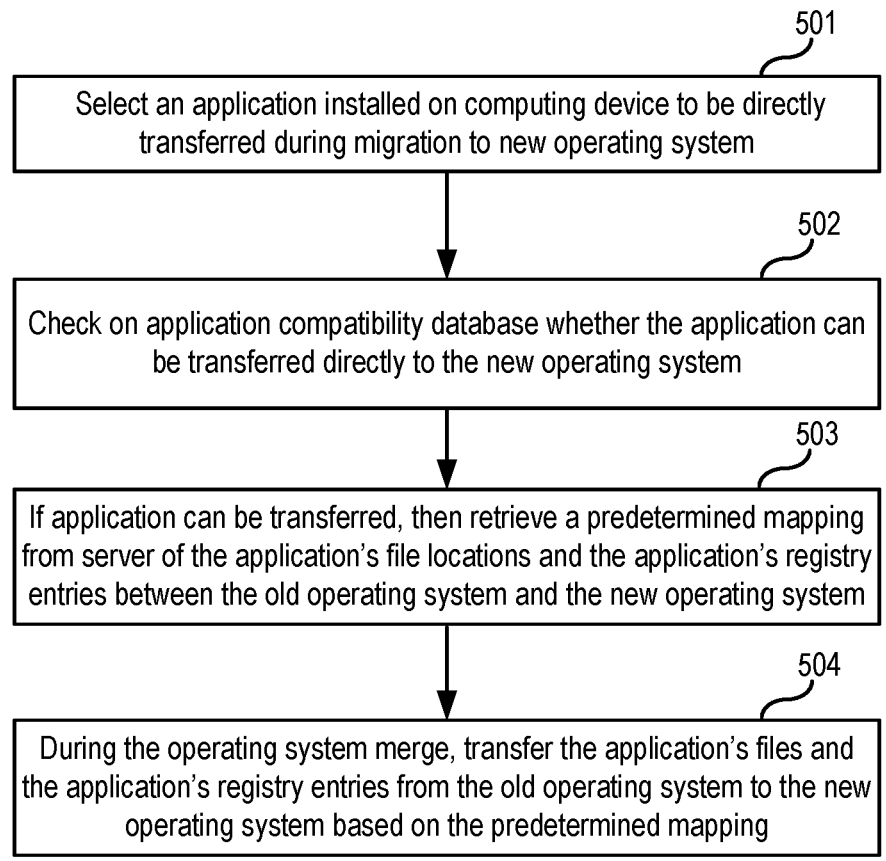
FIG. 5 illustrates an example of a process for directly transferring an application from an old operating system to a new operating system during operation system migration, according to various embodiments.

FIG. 5 illustrates an example of a process for directly transferring an application from an old operating system to a new operating system during operation system migration, according to various embodiments. The system can select an application installed on a computing device 501 that is to be directly transferred to the new operating system during migration to the new operating system. The computing device may be one of numerous computing devices on a network of computer devices centrally managed by a server through the network. The system can select the application according to a pre-determined logic that indicates that this application, or this type of application, should be transferred directly. Once an application is selected, the system can check on an application compatibility database whether the application can be transferred directly to the new operating system 502. Such an application compatibility database can be contained in the system to indicate which applications can and/or cannot be directly migrated in this way and/or which applications are not compatible with the new operating system. If the application can be transferred directly, then the system can retrieve a predetermined mapping from the server of the application's file locations and the application's registry entries between the old operating system and the new operating system 503. For example, the system can contain a mapping that described how certain files and registries should be moved from an old operating system to a new operating system to transfer the application. Such a mapping can be uniquely produced for a particular application or for a particular set or type of applications. During the operating system merge, the application's files and the application's registry entries can be transferred from the old operating system to the new operating system based on the predetermined mapping 504.

Figure 6:
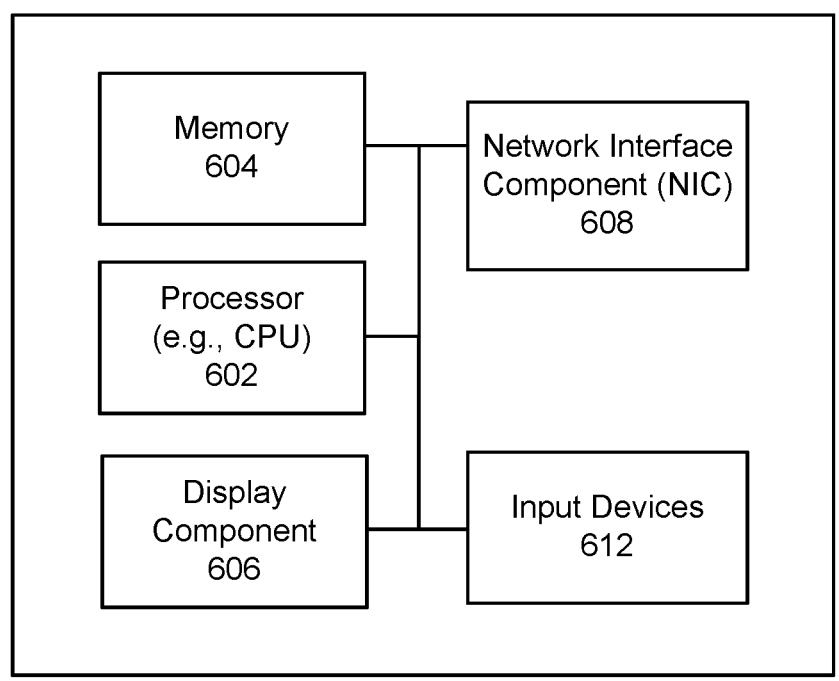
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in physical memory component 604. The memory component 604 can include many types of memory, data storage, or non-transitory computer-readable storage media, such as random access memory (RAM) storing program instructions for execution by the processor 602, a separate form of storage for images or data, a removable memory for sharing information with other devices and the like. The computing device typically can further comprise a display component 606, such as a monitor, a touch screen, liquid crystal display (LCD), or the like. In various embodiments, the computing device will include at least one input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 608 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method based in a central server for migrating a client device centrally managed by the central server over a network from a first operating system to a second operating system, said method comprising:

receiving at the central server a request to migrate the client device from the first operating system to the second operating system;

retrieving from a preexisting library of base layers and application layers on the central server a base layer corresponding to the second operating system, each base layer in the preexisting library comprising an image that contains content of a corresponding operating system such that merging the base layer onto a computing device installs the corresponding operating system on the computing device, and each application layer in the preexisting library comprising content of a corresponding application such that merging the application layer onto the computing device installs the corresponding application on the computing device;

identifying applications that are present on the client device and, based at least on the identified applications, determining a plurality of applications to be installed on the client device in the migration to the second operating system and retrieving application layers corresponding to the determined applications from the preexisting library;

uploading the retrieved base layer and the retrieved application layers to a staging area on the client device; and after uploading the retrieved base layer and the retrieved application layers to the client device, instructing the client device to merge the retrieved base layer and the retrieved application layers onto the client device to migrate the client device from the first operating system to the second operating system with the determined plurality of applications installed on the second operating system.

2. The method of claim 1, wherein the plurality of applications to be installed on the client device in the migration to the second operating system is determined based on which applications are present on the client device before the merge.

3. The method of claim 1, wherein the determining the plurality of applications to be installed on the client device in the migration to the second operating system further comprises:

identifying an application present on the client device before the merge;

identifying a new version of the identified application, the identified new version being compatible with the second operating system; and determining to install the identified new version of the application on the client device in the migration to the second operating system.

4. The method of claim 3, wherein the new version of the identified application is identified based an application version database on the central server, the application version database containing information identifying which applications, and which versions of applications, are compatible with which operating systems.

5. The method of claim 1, wherein the determining the plurality of applications to be installed on the client device in the migration to the second operating system is based on a rule engine, the rule engine indicating which applications are to be installed on a particular client device based on at least one of:

characteristics of the particular client device; or
characteristics of a user of the particular client device.

6. The method of claim 1, wherein the determining the plurality of applications to be installed on the client device in the migration to the second operating system further comprises:

identifying an application present on the client device before the merge;

determining that the identified application is not compatible with the second operating system; and determining to not install the identified application on the client device in the migration to the second operating system.

7. The method of claim 6, wherein the determining that the identified application is not compatible with the second operating system is performed based on an application version database on the central server, the application version database containing information identifying which applications, and which versions of applications, are compatible with which operating systems.

8. A computing device comprising a central server for migrating a client device centrally managed by the central server over a network from a first operating system to a second operating system, comprising:

at least one processor; and memory including instructions that, when executed by the at least one processor, cause the computing device to perform the steps of:

receiving at the central server a request to migrate the client device from the first operating system to the second operating system;

retrieving from a preexisting library of base layers and application layers on the central server a base layer corresponding to the second operating system, each base layer in the preexisting library comprising an image that contains content of a corresponding operating system such that merging the base layer onto a computing device installs the corresponding operating system on the computing device, and each application layer in the preexisting library comprising content of a corresponding application such that merging the application layer onto the computing device installs the corresponding application on the computing device;

identifying applications that are present on the client device and, based at least on the identified applications, determining a plurality of applications to be installed on the client device in the migration to the second operating system and retrieving application layers corresponding to the determined applications from the preexisting library;

uploading the retrieved base layer and the retrieved application layers from the central server to a staging area on the client device; and after uploading the retrieved base layer and the retrieved application layers to the client device, instructing the client device to merge the retrieved base layer and the retrieved application layers onto the client device to migrate the client device from the first operating system to the second operating system with the determined plurality of applications installed on the second operating system.

9. The computing device of claim 8, wherein the plurality of applications to be installed on the client device in the migration to the second operating system is determined based on which applications are present on the client device before the merge.

10. The computing device of claim 8, wherein the determining the plurality of applications to be installed on the client device in the migration to the second operating system further comprises:

identifying an application present on the client device before the merge;

identifying a new version of the identified application, the identified new version being compatible with the second operating system; and determining to install the identified new version of the application on the client device in the migration to the second operating system.

11. The computing device of claim 10, wherein the new version of the identified application is identified based an application version database on the central server, the application version database containing information identifying which applications, and which versions of applications, are compatible with which operating systems.

12. The computing device of claim 8, wherein the determining the plurality of applications to be installed on the client device in the migration to the second operating system is based on a rule engine, the rule engine defining which applications are to be installed on a particular client device based on at least one of:

characteristics of the particular client device; or characteristics of a user of the particular client device.

13. The computing device of claim 8, wherein the determining the plurality of applications to be installed on the computing device in the migration to the second operating system further comprises:

identifying an application present on the client device before the merge;

determining that the identified application is not compatible with the second operating system; and determining to not install the identified application on the client device in the migration to the second operating system.

14. The computing device of claim 13, wherein the determining that the identified application is not compatible with the second operating system is performed based on an application version database on the central server, the application version database containing information identifying which applications, and which versions of applications, are compatible with which operating systems.

15. A non-transitory computer readable storage medium for migrating a client device centrally managed by a central server over a network from a first operating system to a second operating system comprising one or more sequences of instructions, the instructions when executed by one or more processors causing the one or more processors to execute the operations of:

receiving at the central server a request to migrate the client device from the first operating system to the second operating system;

retrieving from a preexisting library of base layers and application layers on the central server a base layer corresponding to the second operating system, each base layer in the preexisting library comprising an image that contains content of a corresponding operating system such that merging the base layer onto a computing device installs the corresponding operating system on the computing device, and each application layer in the preexisting library comprising content of a corresponding application such that merging the application layer onto the computing device installs the corresponding application on the computing device;

identifying applications that are present on the client device and, based at least on the identified applications, determining a plurality of applications to be installed on the client device in the migration to the second operating system and retrieving application layers corresponding to the determined applications from the preexisting library;

uploading the retrieved base layer and the retrieved application layers to a staging area on the client device; and after uploading the retrieved base layer and the retrieved application layers to the client device, instructing the client device to merge the retrieved base layer and the retrieved application layers onto the client device to migrate the client device from the first operating system to the second operating system with the determined plurality of applications installed on the second operating system.

16. The non-transitory computer readable storage medium of claim 15, wherein the plurality of applications to be installed on the client device in the migration to the second operating system is determined based on which applications are present on the client device before the merge.

17. The non-transitory computer readable storage medium of claim 15, wherein the determining the plurality of applications to be installed on the client device in the migration to the second operating system further comprises:
 identifying an application present on the client device before the merge;
 identifying a new version of the identified application, the identified new version being compatible with the second operating system; and
 determining to install the identified new version of the application on the client device in the migration to the second operating system.

18. The non-transitory computer readable storage medium of claim 17, wherein the new version of the identified application is identified based an application version database on the central server, the application version database containing information identifying which applications, and which versions of applications, are compatible with which operating systems.

19. The non-transitory computer readable storage medium of claim 15, wherein the determining the plurality of applications to be installed on the client device in the migration to the second operating system is based on a rule engine, the rule engine indicating which applications are to be installed on a particular client device based on at least one of:
 characteristics of the particular client device; or
 characteristics of a user of the particular client device.

20. The non-transitory computer readable storage medium of claim 15, wherein the determining the plurality of applications to be installed on the client device in the migration to the second operating system further comprises:
 identifying an application present on the client device before the merge;
 determining that the identified application is not compatible with the second operating system; and
 determining to not install the identified application on the client device in the migration to the second operating system.

\* \* \* \* \*